(No Model.) 2 Sheets—Sheet 1.
R. E. CONVERT.
WATER SUPPLY REGULATOR.
No. 544,027. Patented Aug. 6, 1895.
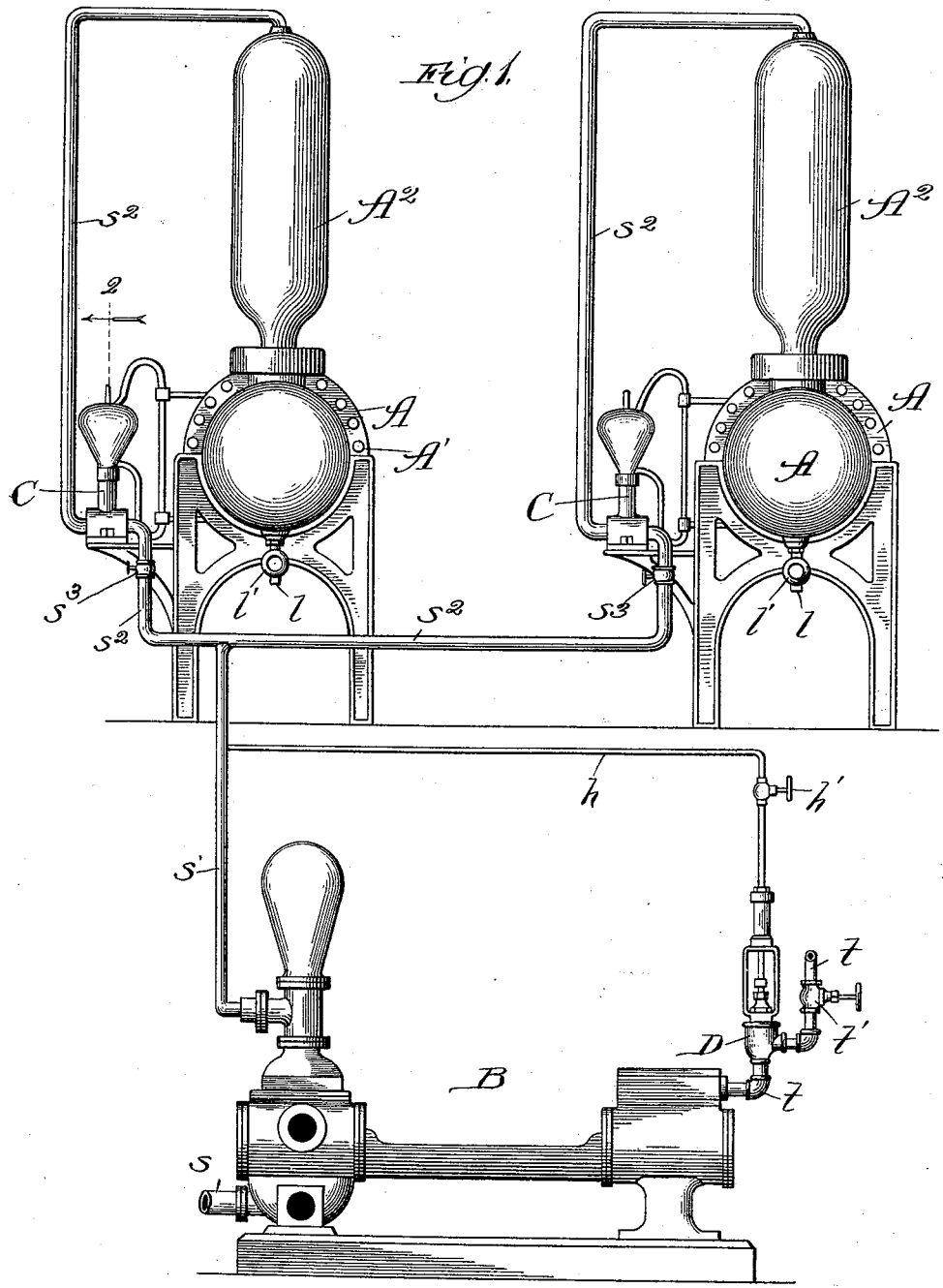
Witnesses:
Chas. E. Gaylord,
Lute J. Alter
Inventor:
Richard E. Convert.
By Dyrenforth & Dyrenforth
Attys.

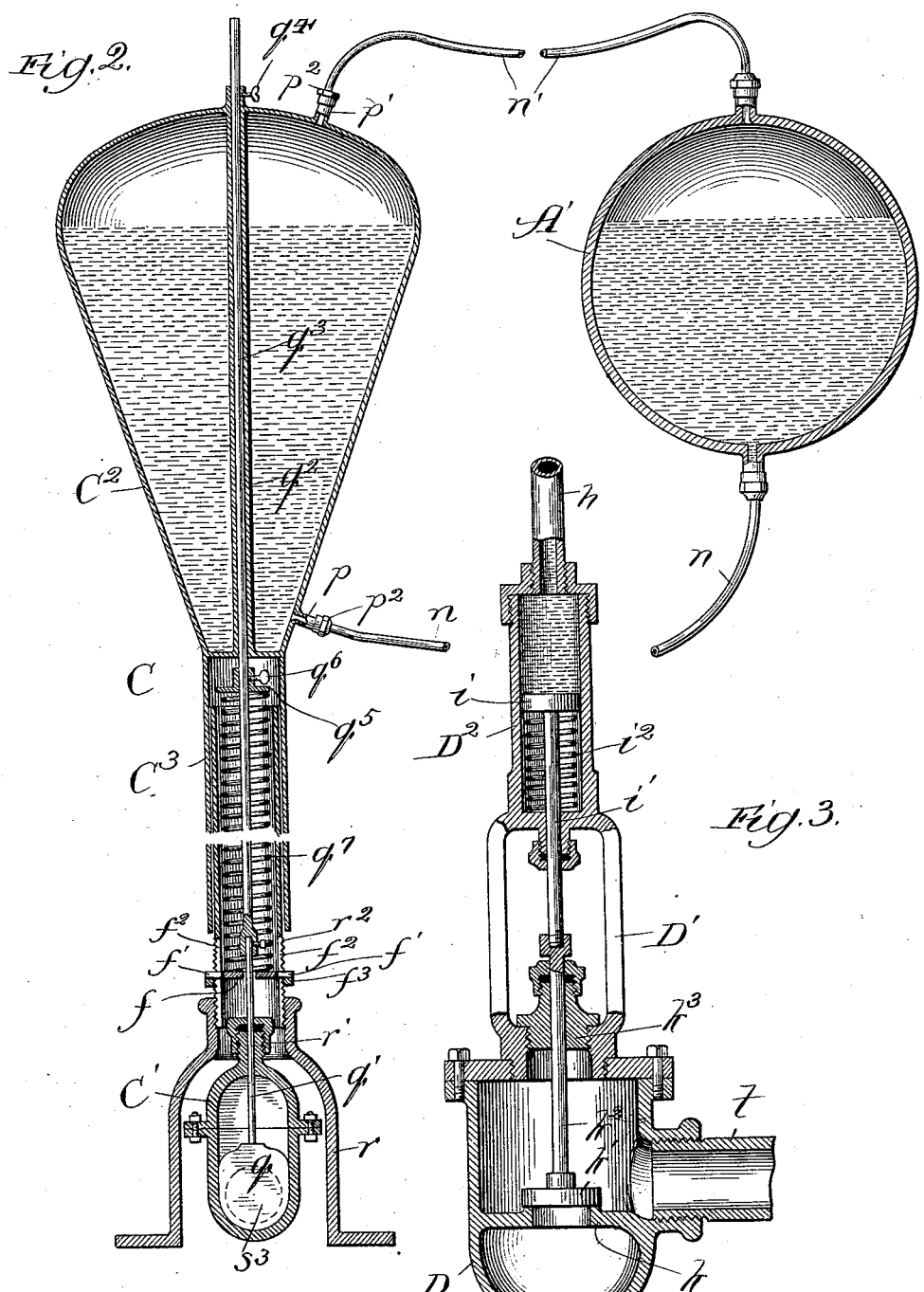

UNITED STATES PATENT OFFICE.

RICHARD E. CONVERT, OF CHICAGO, ILLINOIS.

WATER-SUPPLY REGULATOR.

SPECIFICATION forming part of Letters Patent No. 544,027, dated August 6, 1895.

Application filed January 11, 1895. Serial No. 534,513. (No model.)

*To all whom it may concern:*

Be it known that I, RICHARD E. CONVERT, a subject of the Emperor of Germany, residing at Chicago, in the county of Cook and State of Illinois, have invented a new and useful Improvement in Water-Supply Regulators, of which the following is a specification.

My invention relates to improvements in water-supply regulators generally, though my object is more particularly to provide mechanism for automatically regulating the supply of water to the cylinders or water-receptacles of soda-water or other apparatus employed in the manufacture of carbonated beverages.

In the drawings, Figure 1 is a view in the nature of a diagram, showing a water-supply pump, two carbonating-machines connected therewith, and my improved mechanism for regulating the operation of the pump and the supply of water to the carbonators; Fig. 2, an enlarged broken sectional view also in the nature of a diagram, showing mechanism for cutting off the supply of water from the supply-pipe to the carbonator-cylinder when the water reaches a certain level in the latter; and Fig. 3, a broken section, enlarged, of means for shutting off the supply of steam to the pump by back-pressure of water in the supply-pipe.

A A are carbonators, of which there may be any desired number, to be supplied with water from the steam-pump B. The carbonators shown are of an improved construction, forming the subject of an application for Letters Patent of the United States, filed simultaneously herewith, Serial No. 534,514.

A' A' are the water receptacles or cylinders of the carbonators, and $A^2$ dome-chambers.

At the pump B is a steam-supply pipe $t$, provided with a valve $t'$, a water-inlet pipe $s$, and a discharge-pipe $s'$, leading to branch pipes $s^2$ $s^2$, which are the supply-pipes for the carbonators.

Interposed in the supply-pipes $s^2$ are regulators C C, shown in section in Fig. 2, but upon a much larger scale, comparatively, than the cylinder A'. In fact the relative sizes of the carbonator-cylinder A' and regulator C are, in practice, about as indicated in Fig. 1.

The regulator C comprises a base portion $r$, inclosing a valve shell or chamber C', which is interposed in the branch pipe $s^2$. In the chamber C' is a suitable valve $q$ upon a stem $q'$, which passes upward through a stuffing-box $r'$ at the top of the shell or chamber C'. Rising from the top of the base $r$ is a cylinder $r^2$ open at the top.

$C^2$ is a close annular chamber through the center of which extends a vertical tube $q^2$, and provided with openings $p$ $p'$, provided with hose-couplings $p^2$. Extending downward from the base of the chamber $C^2$ is a cylindrical extension $C^3$, which passes loosely over the cylinder $r^2$, the parts telescoping together. A rod $q^3$ passes downward through the tube $q^2$ in the chamber $C^2$, and at its lower end connects with the upper end of the valve-stem $q'$. At its upper end the rod $q^3$ is fastened to the top of the chamber $C^2$ by means of a thumb-screw $q^4$. In the chamber formed by the cylinders $C^3$ $r^2$ is a collar $q^5$, adjustably fastened to the rod $q^3$ by a thumb-screw $q^6$, and extending around the said rod and confined between the collar $q^5$ and a raising and lowering plate $f$ is a helical spring $q^7$. The spring $q^7$ supports the weight of the chamber $C^2$ and cylindrical extension $C^3$, and the tendency of the spring is to raise the said parts, whereby the rod $q^3$ is drawn in the upward direction to raise the stem $q'$ and valve $q$ and uncover the port $s^3$ of the pipe $s^2$. The plate $f$ is provided with ears $f'$, which pass through vertical slots $f^2$ in opposite sides of the cylinder $r^2$, which latter is threaded on its outer side. The ears rest on a nut $f^3$, which works on the threaded portion of the cylinder $r^2$. By turning the nut $f^3$ the plate $f$ may be raised and lowered, and the tension of the spring $q^7$ thus regulated.

Extending from the opening $p$, being fastened thereto at one end by means of the coupler $p^2$, is a hose-section $n$, leading to the under side of the adjacent carbonator-cylinder A', and a hose-section $n'$ extends from the opening $p'$ of the chamber $C^2$ to the upper side of the carbonating-cylinder A'. The chamber $C^2$ of the regulator is at the side of and extends to, or approximately to, the top of the cylinder A', and the spring $q^7$ is so regulated by adjustment of the nut $f^3$ that the weight of the chamber $C^2$ will overcome the resistance of the spring and sink to close the valve $q$ when a given quantity of water has entered the chamber.

In operation the pump B when started will pump water through the pipe $s'$ and branch pipe $s^2$ and through the interposed ports $s^3$ into the top of the dome-chamber $A^2$ of each carbonator. Water flowing to the cylinder $A'$ also passes through the hose-section $n$ to the chamber $C^2$, while air is vented from the top of the chamber $C^2$ through the hose $n'$ to the cylinder $A'$. When the water has reached the desired level in the cylinder $A'$ and chamber $C^2$, the weight of the water in the chamber $C^2$ overcomes the resistance of the spring $q^7$ and closes the valve $q$, whereby the supply of water to the respective cylinder $A'$ is cut off. When, by the injection of carbonic-acid gas, the water in the cylinder $A'$ is sufficiently charged it may be withdrawn through discharge-pipes $l$. Before opening the valves $l'$ at the pipes $l$ valves $s^3$ in the branch pipes $s^2$ may be closed to shut off the supply of water until the respective cylinder $A'$ is drained of its contents. When the contents of the cylinder $A'$ are withdrawn the water-level in the chamber $C^2$ will lower with that of the cylinder and permit the spring $q^7$ to raise the chamber and open the valve $q$, whereby, when in the next operation the respective valve $s^3$ is opened, water will flow freely to the carbonating-cylinder until shut off by the regulating mechanism C. When the carbonators are worked continuously—that is to say, when contents are withdrawn more or less constantly while water flows into the cylinders and is carbonated—the regulator C will rise and fall as the water-level changes, and maintain the valve $q$ open just sufficiently to cause water to flow to the cylinder as fast as contents are withdrawn.

Interposed in the steam-pipe $t$ is a valve-shell D, presenting a valve-seat $k$, upon which seats an opening and closing valve $k'$ provided with a stem $k^2$. The stem $k^2$ extends upward through a stuffing-box $k^3$ in the top of the shell or chamber D. Mounted upon the shell or chamber D is a frame D', carrying a piston-chamber $D^2$. In the chamber $D^2$ is a piston $i$ upon a stem $i'$, which passes through a stuffing-box in the lower part of the chamber and connects with the valve-stem $k^2$. Confined between the piston $i$ and lower part of the chamber $D^2$ is a spring $i^2$. The tendency of the spring $i^2$ is to raise the piston $i$, and through the latter draw up the stems $i'$ $k^2$ and lift the valve $k'$ from its seat, whereby steam flows freely to the pump to operate the latter. Extending from the top of the chamber $D^2$ is a pipe $h$, leading to the water-supply pipe $s'$.

In operation, the valve $h'$ being opened, when water pumped through the pipe $s^2$ has filled the receptacles or cylinders of the carbonators to cause the regulators C to shut off the supply, the continued operation of the pump will raise the pressure in the pipe $s'$ and branch pipes to the valves $q$ of the regulators, and without some means such as I provide to prevent it there would be danger of bursting of the pipes. The spring $i^2$ is capable of resisting pressure against the piston $i$ during the normal operation of the machine; but under the increased pressure in the pipe $s'$, and consequently in the pipe $h$, under the continued action of the pump when the said valves are closed, the piston $i$ is forced downward against the resistance of the spring $i^2$, and by moving down the stems $i'$ $k^2$ closes the valve $k'$ and shuts off the supply of steam, causing stoppage of the pump. When the pressure is relieved by opening any valve which will cause water to flow to a carbonating-cylinder, the spring $i^2$ will raise the piston $i$ and open the valve $k'$ to start the pump.

My improvements constructed as described are automatic in their operation, and while I prefer to provide the mechanism in every detail as shown and described, the construction is subject to modification in the matter of details without departing from the spirit of my invention as defined by the claim.

What I claim as new, and desire to secure by Letters Patent, is—

The combination with two or more receptacles, of a steam actuated pump, a water-supply-pipe extending from the pump and communicating with all the receptacles, a water-supply regulator at each receptacle comprising a valve interposed between the respective receptacle and the supply-pipe, and valve closing means operated by the rise of water in the receptacles above a predetermined level, and means for stopping the pump when all the said valves are closed, comprising a valve interposed in the steam supply-pipe, a stem on the valve, a chamber in open communication with the water-supply-pipe, a movable abutment in the chamber connected with the said stem and subject on one side to pressure from the water supply-pipe and a spring operating counter to the water pressure to maintain said abutment normally in the position of opening the said valve, the parts being so constructed and arranged that rise of pressure in the water supply-pipe will move the abutment against the resistance of the spring and close the said valve in the steam supply-pipe, substantially as and for the purpose set forth.

RICHARD E. CONVERT.

In presence of—
J. N. HANSON,
M. J. FROST.